(12) United States Patent
Uebbing

(10) Patent No.: US 7,643,055 B2
(45) Date of Patent: Jan. 5, 2010

(54) MOTION DETECTING CAMERA SYSTEM

(75) Inventor: John J. Uebbing, Palo Alto, CA (US)

(73) Assignee: Aptina Imaging Corporation, Grand Cayman (KY)

( * ) Notice: Subject to any disclaimer, the term of this patent is extended or adjusted under 35 U.S.C. 154(b) by 1055 days.

(21) Appl. No.: 10/423,523

(22) Filed: Apr. 25, 2003

(65) Prior Publication Data

US 2004/0212677 A1 Oct. 28, 2004

(51) Int. Cl.
*H04N 7/18* (2006.01)
(52) U.S. Cl. ...................... 348/155; 348/152
(58) Field of Classification Search ............. 348/135, 348/139, 142–143, 152–155, 159, 208.13, 348/211.11, 211.13, 208.16, 211.9
See application file for complete search history.

(56) References Cited

U.S. PATENT DOCUMENTS

| | | | | |
|---|---|---|---|---|
| 5,365,597 | A * | 11/1994 | Holeva ........................ 382/318 |
| 5,434,617 | A * | 7/1995 | Bianchi ...................... 348/170 |
| 5,898,459 | A * | 4/1999 | Smith et al. ............... 348/219.1 |
| 6,028,626 | A * | 2/2000 | Aviv .......................... 348/152 |
| 6,079,862 | A * | 6/2000 | Kawashima et al. ........ 382/103 |
| 6,215,519 | B1 * | 4/2001 | Nayar et al. ................ 348/159 |
| 6,295,064 | B1 * | 9/2001 | Yamaguchi ................. 345/419 |
| 6,326,994 | B1 * | 12/2001 | Yoshimatsu .................. 348/46 |
| 6,392,632 | B1 * | 5/2002 | Lee .............................. 345/158 |
| 6,392,694 | B1 * | 5/2002 | Bianchi ...................... 348/169 |
| 6,473,122 | B1 * | 10/2002 | Kanekal ...................... 348/340 |
| 6,646,264 | B1 * | 11/2003 | Modiano et al. ........ 250/339.07 |
| 6,677,979 | B1 * | 1/2004 | Westfield .................. 348/14.12 |
| 6,677,990 | B1 * | 1/2004 | Kawahara ............... 348/211.13 |
| 2003/0025800 | A1 * | 2/2003 | Hunter et al. ........... 348/208.13 |
| 2003/0071891 | A1 * | 4/2003 | Geng ............................ 348/39 |
| 2003/0095186 | A1 * | 5/2003 | Aman et al. ................. 348/162 |
| 2004/0001149 | A1 * | 1/2004 | Smith ....................... 348/218.1 |

FOREIGN PATENT DOCUMENTS

| | | |
|---|---|---|
| EP | 0889452 A3 | 2/1998 |
| GB | 2378339 A | 5/2003 |
| GB | 2379354 A | 5/2003 |
| JP | 62-265880 | 11/1987 |
| JP | 08-317378 | 11/1996 |
| JP | 10-191304 | 7/1998 |
| WO | WO98/08208 A3 | 2/1998 |

OTHER PUBLICATIONS

Agilent product information and literature webpage entitled "ADNS-2030 High-Performance, Low Power Optical Mouse Sensor (Optimized for Cordless Mouse Applications)"; 2000; 2 pgs.

(Continued)

*Primary Examiner*—David Czekaj
(74) *Attorney, Agent, or Firm*—RatnerPrestia

(57) ABSTRACT

A camera system includes a first camera having a low-resolution image sensor with a plurality of image sensing regions. The camera system includes a plurality of high-resolution cameras. Each of the high-resolution cameras is associated with a set of the plurality of image sensing regions. The first camera is configured to detect motion based on sensed images, identify a set of the image sensing regions based on the motion, and power on the high-resolution camera associated with the identified set of image sensing regions.

16 Claims, 5 Drawing Sheets

OTHER PUBLICATIONS

Agilent product information packet entitled "Optical Mice and How They Work"; Nov. 5, 2001; 4 pgs.

Agilent product overview entitled "Agilent ADNA-2030 Optical Mouse Sensor"; Mar. 10, 2003; 4 pgs.

Agilent data sheet entitled "Agilent ADNS 2030 Low Power Optical Mouse Sensor"; Mar. 12, 2003; 36 pgs.

MCM Electronics homepage (www.mcmelectronics.com); Apr. 25, 2003; 1 pg.

MCM Electronics product catalog; pp. 564-565.

Examiner of JPO Suzuki, Akira, Notice of Rejection Ground for Japanese patent application No. 2004-125704 and English Translation, Japanese Patent Office, Jul. 21, 2009, pp.1-2, JPO, Japan.

* cited by examiner

MOTION DETECTING CAMERA SYSTEM

THE FIELD OF THE INVENTION

This invention relates generally to camera systems, and relates more particularly to a motion detecting camera system.

BACKGROUND OF THE INVENTION

For video security camera systems, it is desirable to capture high-resolution images for various reasons, such as to be able to recognize the faces of individuals appearing in the images. Security camera systems that capture high-resolution images typically consume relatively large amounts of power, and are usually not battery-powered, or if they are battery-powered, the battery life is relatively short due to the large power consumption. Some security camera systems are also configured to record at all times, rather than only when there is activity, which wastes video tape or digital recording space.

Some security camera systems use passive infrared (PIR) motion detectors to detect motion and trigger a security camera. PIR motion detectors detect radiated energy, such as energy radiated by a human or animal. PIR motion detection devices typically cost about $20, and usually draw ten to twenty milliamps at twelve volts (i.e., 120-240 milliwatts (mW)). A typical nine-volt battery offers 565 milliamp hours (mAH), which would provide about five hours of continual operation for such PIR devices—a relatively short duration.

SUMMARY OF THE INVENTION

One form of the present invention provides a camera system including a first camera having a low-resolution image sensor with a plurality of image sensing regions. The camera system also includes a plurality of high-resolution cameras. Each of the high-resolution cameras is associated with a set of the plurality of image sensing regions. The first camera is configured to detect motion based on sensed images, identify a set of the image sensing regions based on the motion, and power on the high-resolution camera associated with the identified set of image sensing regions.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
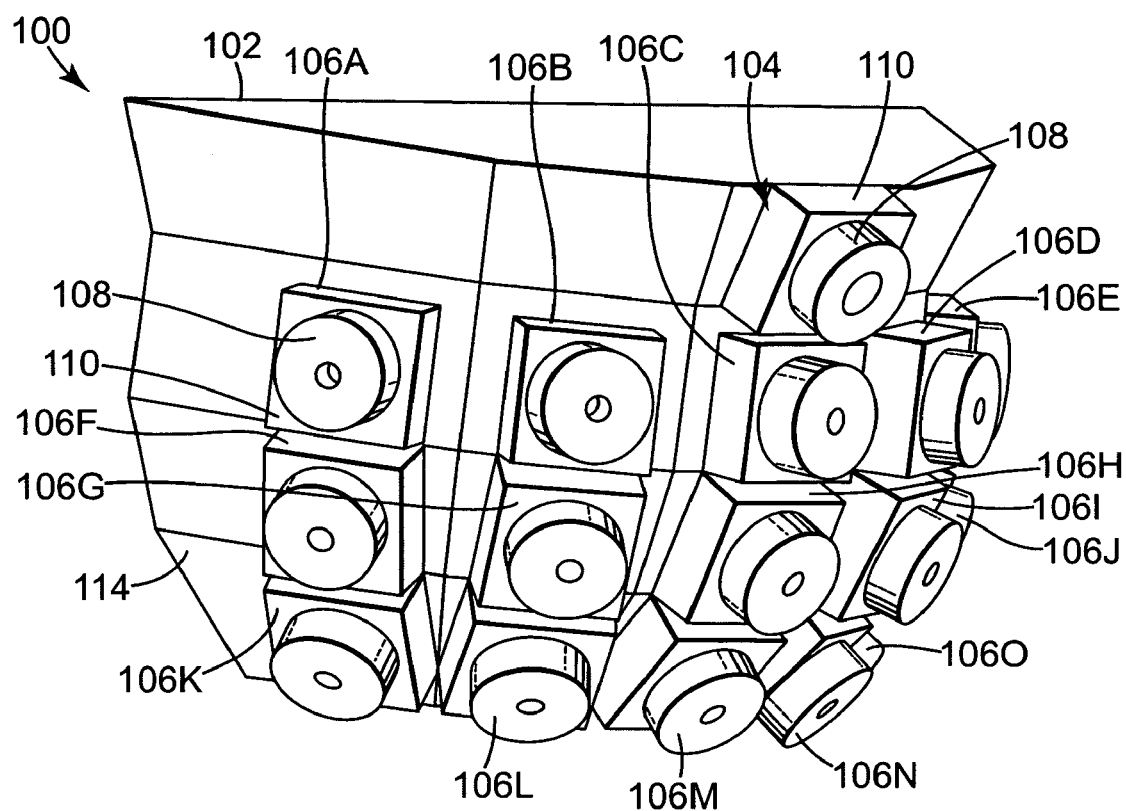
FIG. 1 is a perspective view of a low power security camera system according to one embodiment of the present invention.

FIG. 1 is a perspective view of a low power security camera system 100 according to one embodiment of the present invention. Camera system 100 includes mounting apparatus 102, detection camera 104, and fifteen tracking cameras 106A-106O (collectively referred to as tracking cameras 106). Detection camera 104 and tracking cameras 106 are mounted on a mounting surface 114 of mounting apparatus 102. In one form of the invention, detection camera 104 and tracking cameras 106 each include a housing 110, and a lens assembly 108 attached to the housing 110.

In one form of the invention, each tracking camera 106 has a field of view of about thirty degrees horizontally and twenty degrees vertically, and tracking cameras 106 have a combined field of view of about one hundred fifty degrees by sixty degrees. In one embodiment, detection camera 104 has a field of view that encompasses the fields of view of all of the tracking cameras 106 (e.g., a field of view greater than or equal to one hundred fifty degrees by sixty degrees in one embodiment). In one form of the invention, the fields of view of adjacent tracking cameras 106 partially overlap. In other embodiments of the present invention, camera system 100 may incorporate a number of detection cameras 104 and tracking cameras 106 that is different than the number illustrated in FIG. 1, and detection camera 104 and tracking cameras 106 may have fields of view that are larger or smaller than the values provided above for one embodiment.

In one form of the invention, tracking cameras 106 are normally off to conserve power. Detection camera 104 detects when motion occurs within the field of view of camera 104, and turns on appropriate ones of the tracking cameras 106 to record high-resolution images of the event that triggered the motion detection. In one embodiment, each tracking camera 106 includes a high-resolution complimentary metal oxide semiconductor (CMOS) image sensor with hundreds of thousands, or millions of pixels, (e.g., a 640×480 pixel sensor), and detection camera 104 includes a low-resolution CMOS image sensor with less than 1000 pixels (e.g., a 30×12 pixel sensor). In another embodiment, the high-resolution CMOS image sensor of each tracking camera 106 is implemented with a plurality of lower resolution CMOS image sensors.

Figure 2:
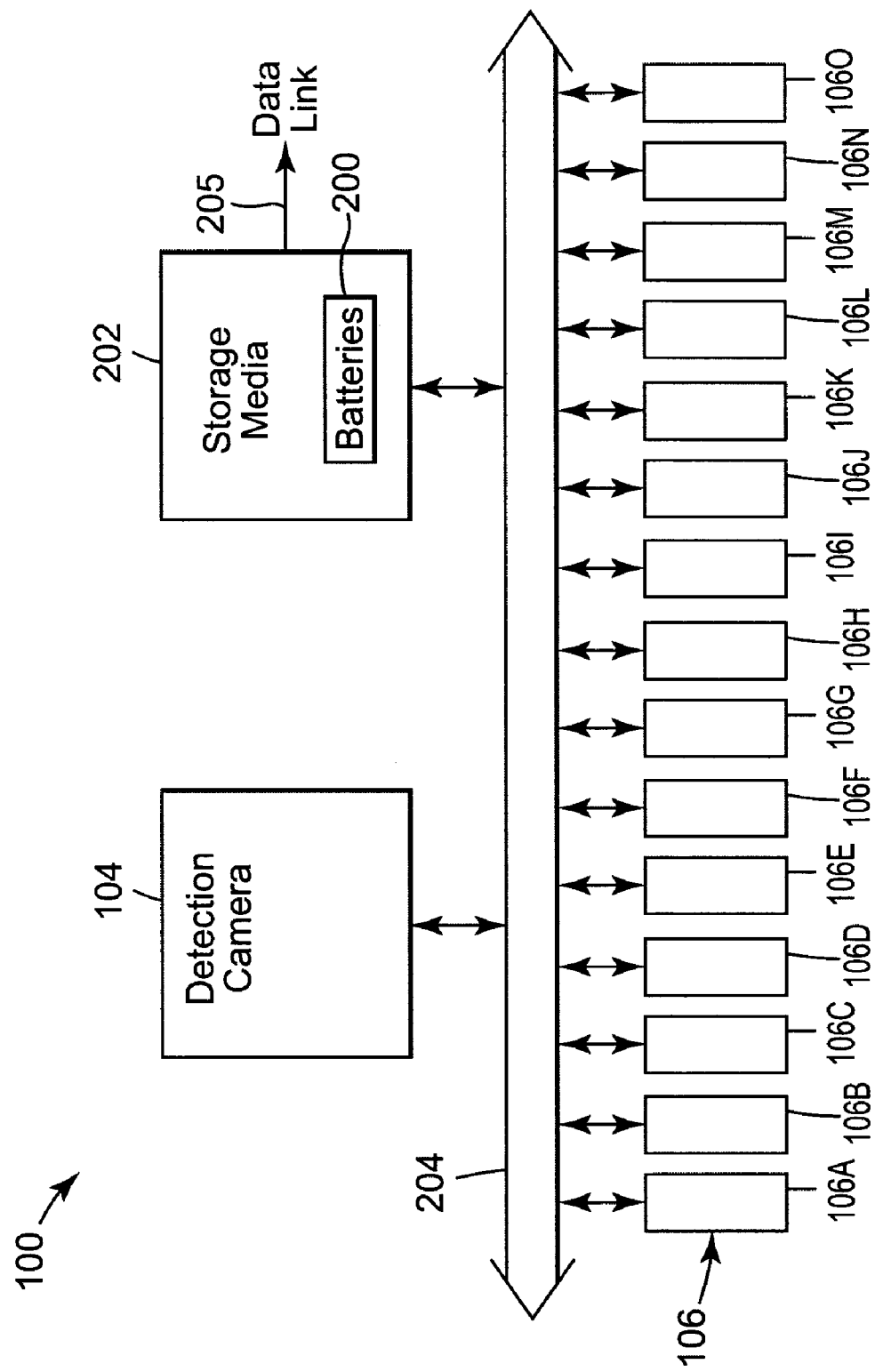
FIG. 2 is block diagram illustrating major components of the camera system shown in FIG. 1 according to one embodiment of the present invention.

FIG. 2 is block diagram illustrating major components of the camera system 100 shown in FIG. 1 according to one embodiment of the present invention. Camera system 100 includes the detection camera 104, the fifteen tracking cameras 106, and storage media 202. As shown in FIG. 2, detection camera 104, storage media 202, and tracking cameras 106 are communicatively coupled together via communication bus 204. In one form of the invention, detection camera 104 and tracking cameras 106 output captured images to storage media 202 via communication bus 204. In one form of the invention, detection camera 104 transmits control signals to tracking cameras 106 via communication bus 204 based on detected motion, as described in further detail below. In one embodiment, the storage media 202 is positioned within mounting apparatus 102 (FIG. 1), and includes one or more devices for storing received images, such as a conventional video cassette recorder (VCR), digital video disk recorder (DVD recorder), hard disk drive, or other device for storing images.

In one form of the invention, storage media 202 is coupled to a data link 205 for transmitting stored images to a user. In one embodiment, communication link 205 is a wired communication link. In another embodiment, communication link 205 is a wireless communication link, such as a digital radio link.

In one embodiment, system 100 includes a single set of batteries 200 at the site of storage media 202 for powering detection camera 104, tracking cameras 106, and data link 205.

Figure 3:
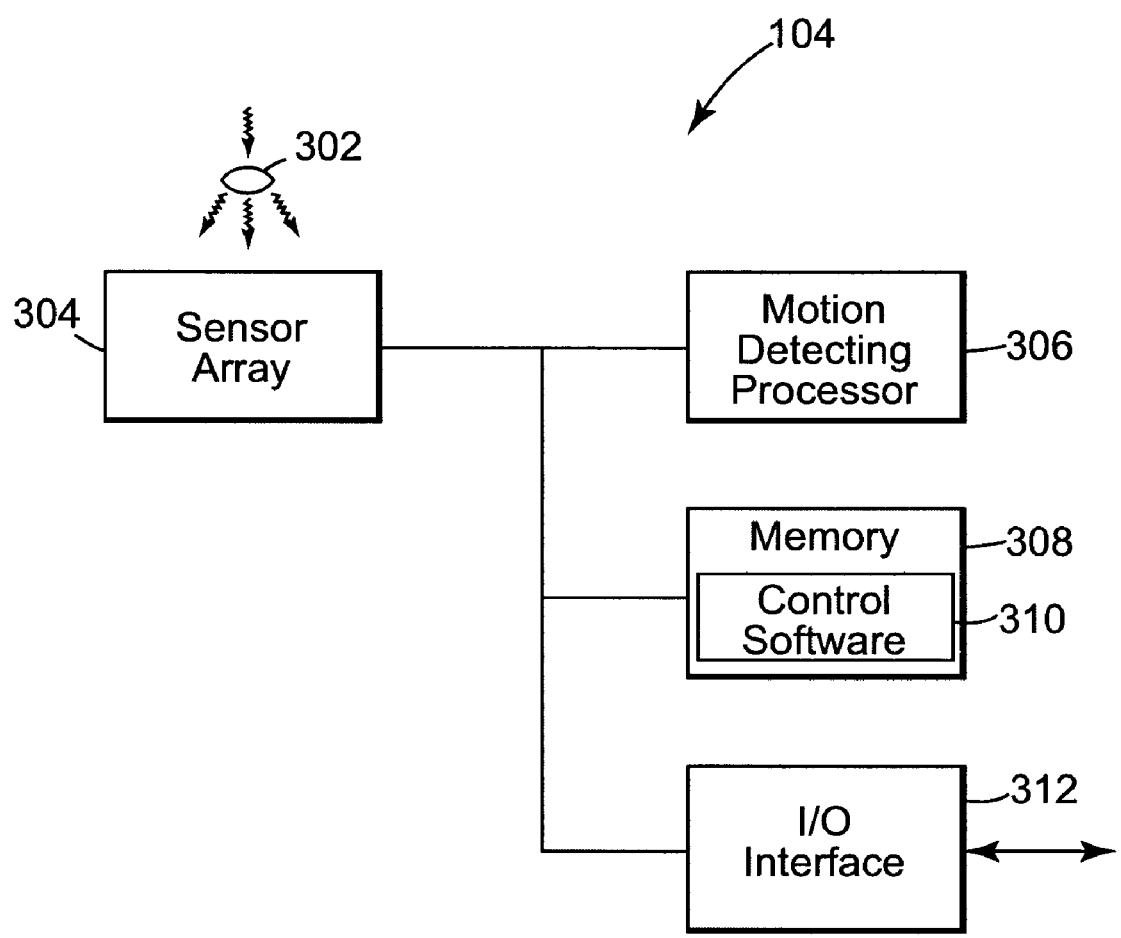
FIG. 3 is a block diagram illustrating major components of the detection camera shown in FIG. 1 according to one embodiment of the present invention.

FIG. 3 is a block diagram illustrating major components of the detection camera 104 shown in FIG. 1 according to one embodiment of the present invention. Detection camera 104 includes lens 302, sensor array 304, motion detecting processor 306, memory 308, and input/output (I/O) interface 312. Control software 310 for controlling processor 306 is stored in memory 308. In one embodiment, memory 308 includes some type of random access memory (RAM) and non-volatile memory, but can include any known type of memory storage.

In operation, according to one embodiment, optical images within the field of view of detection camera 104 are directed by lens 302 onto sensor array 304. In one embodiment, sensor array 304 continually captures images at a programmed frame rate and digitizes the captured images. Successive digital images are compared to each other in processor 306 to identify whether motion has occurred. Motion flags are set in processor 306 when motion is detected. In one embodiment, the motion flags include location identification information that identifies where the motion occurred. Based on the motion flags, processor 306 identifies particular tracking cameras 106 to power on to record the event that triggered the motion flag.

In one embodiment, sensor array 304 is implemented with an Agilent low-power CMOS image sensor, such as the Agilent ADNS-2020 image sensor. In one embodiment, the number of frames captured per second by sensor array 304 is programmable from processor 306. Sensor array 304 can be programmed to capture any number of frames per second, up to several thousand frames per second.

In one embodiment, sensor array 304 is configured to capture one frame per second. In one form of the invention, sensor array 304 is operated primarily in a low power consumption sleep mode, and includes an internal timer (not shown) to wake the sensor array 304 once per second. Each time that sensor array 304 wakes up, the array 304 captures another image. This image is transferred to processor 306, which determines whether motion has occurred, and then sensor array 304 goes back into sleep mode if no motion has occurred. In one form of the invention, during each second of operation, sensor array 304 is in sleep mode for about nine tenths of a second, and then wakes up for about one tenth of a second to capture an image. Processor 306 compares the captured image to a previously captured image to determine whether motion has occurred. Operating sensor array 304 at a low frame rate and in the sleep mode in this manner provides significant power savings. In another embodiment, sensor array 304 is configured to capture more or less than one frame per second.

I/O interface 312 of detection camera 104 is configured to be coupled to communication bus 204 (FIG. 2) to allow detection camera 104 to communicate with storage media 202 and tracking cameras 106. In one embodiment, when processor 306 generates a motion flag, processor 306 sends a control signal to an appropriate one of the tracking cameras 106 via I/O interface 312, which causes the tracking camera 106 to be powered on and begin capturing images.

Processor 306 may use a variety of different techniques for determining whether motion has occurred. Some example motion detection techniques are described below. The motion detection techniques are generally directed at identifying changes between two images, quantifying the amount of change, and comparing the amount of change to a threshold value to determine whether the change is significant enough to generate a motion flag. In one embodiment, the threshold values used by processor 306 are user programmable, and may be set on a pixel by pixel basis, or for entire frames, depending upon the particular motion detection technique used. For example, if one or two pixels repeatedly result in the false generation of motion flags, the threshold values for those specific pixels can be set higher.

In one embodiment, motion detection is accomplished by processor 306 by comparing a newly captured sample frame with a previously captured reference frame. In one form of the invention, processor 306 calculates one or more average intensity values for each sample frame, and compares the average intensity values to values calculated for a previously captured reference frame. If the difference between the average intensity values for the two frames is greater than a predetermined threshold, processor 306 generates a motion flag. The value chosen for the threshold depends upon the desired sensitivity of motion detection. By using a relatively large threshold value, motion flags will only be generated for large movements, such as movements of a human, and motion flags will not be generated for smaller movements, such as those of small animals.

In another embodiment, motion detection is accomplished by processor 306 by comparing a sample frame with a previously captured reference frame on a pixel by pixel basis to determine whether there has been any change between the two frames.

In yet another embodiment, motion detection is accomplished by processor 306 by performing various trial shifts or translations for each frame, where all of the pixels in the frame are shifted in a certain direction. Each of the shifted frames and the original (unshifted) frame are individually correlated with a previously captured reference frame. If the original (unshifted) frame provides the best correlation with the reference frame, no motion flag is generated. If one of the shifted frames provides the best correlation with the reference frame, processor 306 creates a motion flag.

Figure 4:
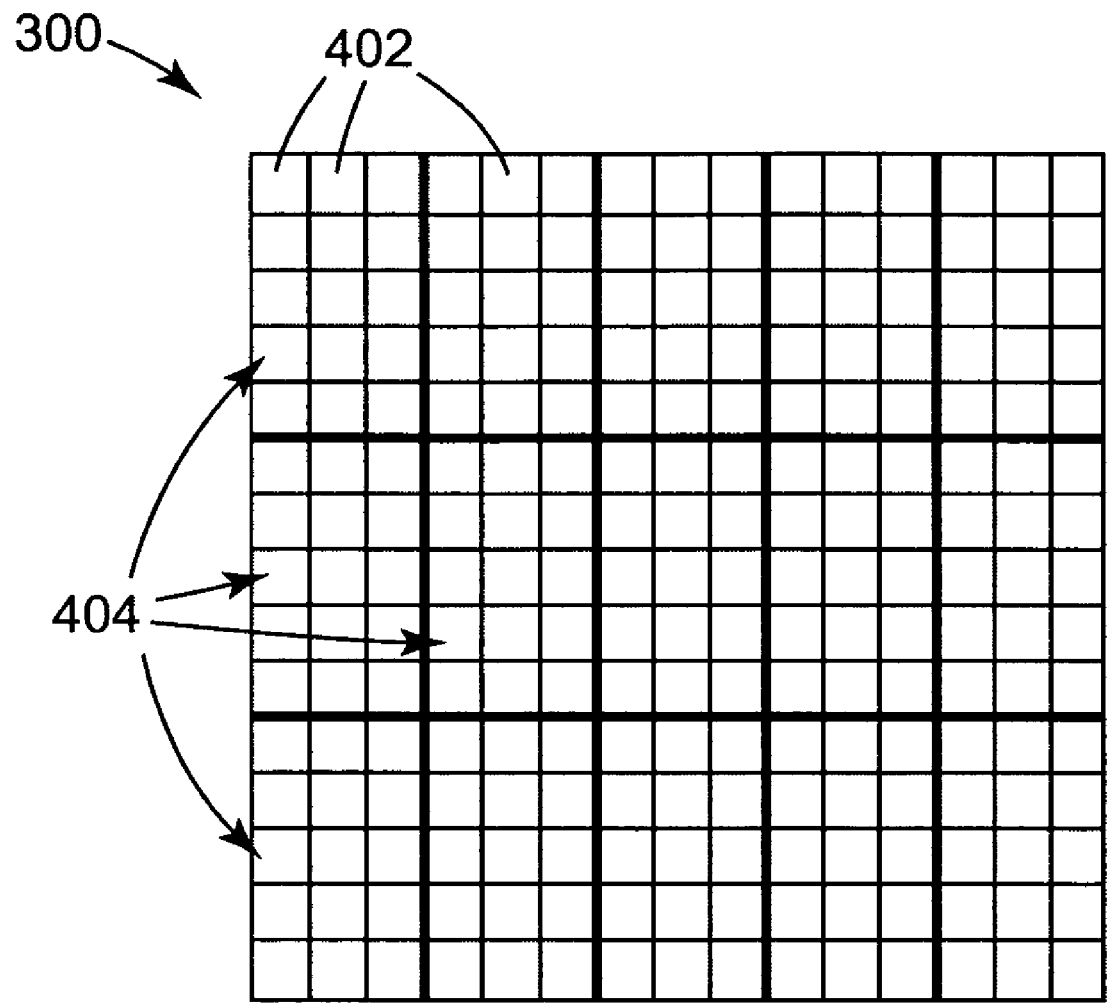
FIG. 4 is a diagram illustrating pixels of the sensor array shown in FIG. 3 according to one embodiment of the present invention.

FIG. 4 is a diagram illustrating pixels of the sensor array 300 shown in FIG. 3 according to one embodiment of the present invention. Sensor array 300 includes a plurality of pixel circuits (pixels) 402. In the illustrated embodiment, sensor array 300 includes a 15×15 array of pixels 402. As shown in FIG. 4, the pixels 402 are grouped into fifteen regions 404, with each region 404 including a 3×5 sub-array of pixels 402. In one embodiment, each region 404 corresponds to one of the fifteen tracking cameras 106. In one form of the invention, the optical image portion focused onto each individual region 404 of sensor array 300 is substantially the same as the image viewed by the tracking camera 106 corresponding to that region 404. In another embodiment, multiple regions 404 correspond to a single tracking camera 106. In yet another embodiment, each region 404 corresponds to multiple tracking cameras 106.

In one embodiment, in addition to comparing or correlating digital images to identify when motion has occurred, processor 306 (FIG. 3) also identifies the particular region(s) 404 of the sensor array 300 where the motion occurred. In one form of the invention, processor 306 calculates an average intensity value for each region 404 of each captured frame. For each pair of frames, processor 306 compares the average intensity values for the reference frame with the corresponding average intensity values for the sample frame. If the difference between the average intensity value of a given region 404 in a reference frame and the average intensity value of that same region 404 in a sample frame is greater than a predetermined threshold value, processor 306 identifies that motion has occurred in that particular region 404.

In one form of the invention, each motion flag created by processor 306 includes a region identifier that identifies one or more regions 404 where motion was detected. Processor 306 powers on the tracking camera(s) 106 corresponding to the one or more regions 404 identified in the motion flag. In one embodiment, after turning on one of the tracking cameras 106, if processor 306 does not create another motion flag identifying a region 404 corresponding to that tracking camera 106 within a predetermined period of time, processor 306 sends a control signal to that tracking camera 106, causing that tracking camera 106 to be powered off.

In one embodiment, each tracking camera 106 that is powered on by processor 306 transmits high-resolution images to storage media 202 (FIG. 2), where the images are stored. By turning on appropriate tracking cameras 106 only when there is activity, as is done in one form of the invention, power consumption is reduced, and less recording space (e.g., video tape or digital recording space) is consumed, making the recorded images easier to search.

Figure 5:
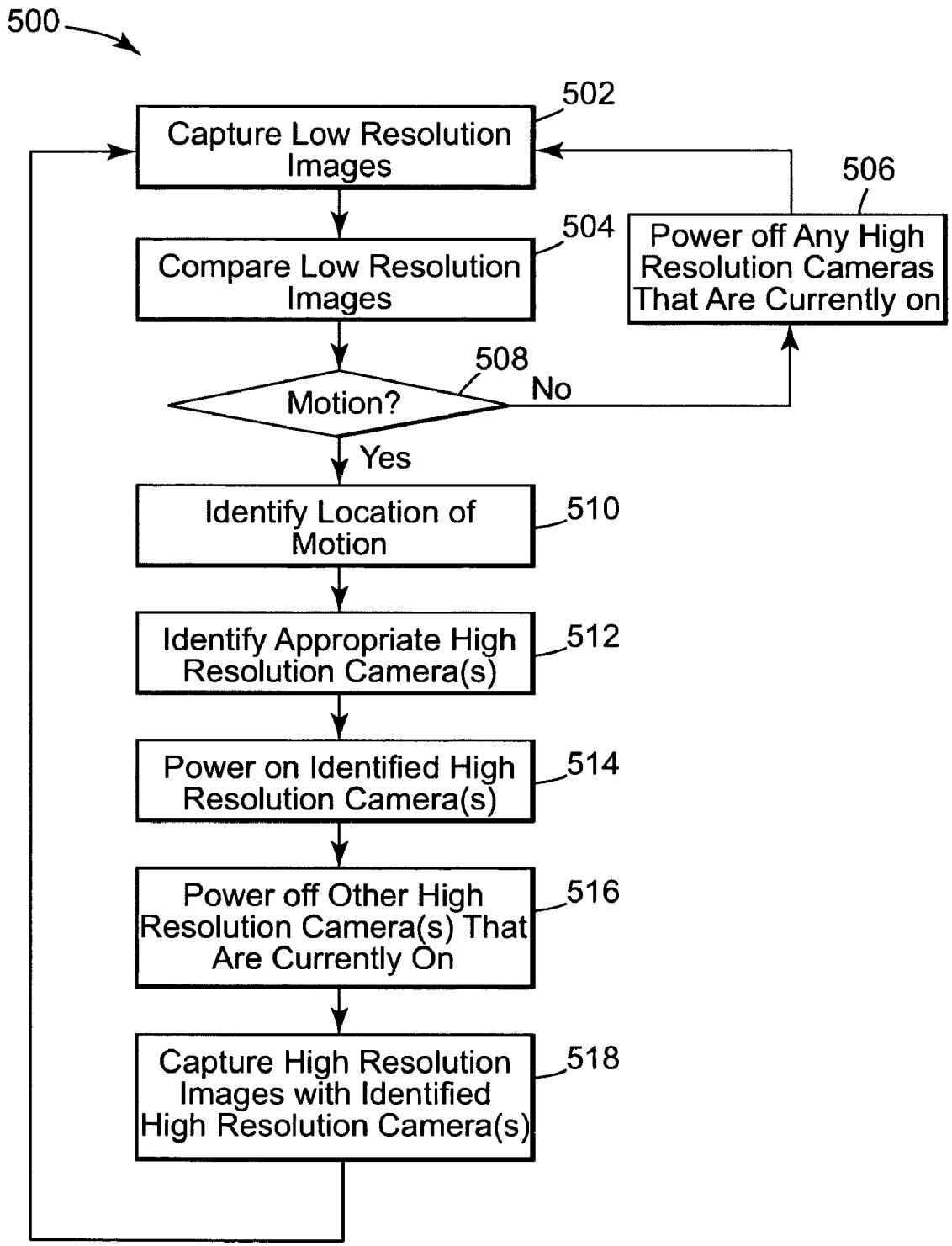
FIG. 5 is a flow diagram illustrating a method for detecting motion and capturing high-resolution images based on the detected motion according to one embodiment of the present invention.

FIG. 5 is a flow diagram illustrating a method 500 for detecting motion and capturing high-resolution images based on the detected motion according to one embodiment of the present invention. In one embodiment, camera system 100 is configured to perform method 500. In step 502, detection camera 104 captures low-resolution images of the scene within its field of view. In step 504, processor 306 compares two successively captured low-resolution images. In step 508, based on the comparison in step 504, processor 306 determines whether motion has occurred. If it is determined in step 508 that no motion has occurred, the method moves to step 506. In step 506, processor 306 causes any tracking cameras 106 that are currently on to be powered off, and the method returns to step 502.

If it is determined in step 508 that motion has occurred, in step 510, processor 306 identifies a location of the motion. Based on the identified location, in step 512, processor 306 identifies one or more tracking cameras 106 corresponding to the identified location. In step 514, processor 306 causes the tracking camera(s) 106 identified in step 512 to be powered on. In step 516, if any tracking cameras 106 are currently on other than the tracking cameras identified in step 512, processor 306 powers off these tracking cameras 106. In step 518, the tracking camera(s) 106 powered on by processor 306 in step 514 begin capturing high-resolution images. The method 500 then returns to step 502.

In one form of the invention, a subset of the pixels 402 in array 300 are "masked out", or programmed to be inactive. For example, the images directed onto some of the pixels 402 in array 300 may be from an area where motion is unlikely to occur (e.g., a ceiling in a room).

One form of the present invention provides electronic pan, zoom, and tilt (PZT) functionality, without the motors used in existing cameras that provide such functionality. For example, if an object moves across a room covered by camera system 100, the object will cross the field of view of multiple ones of the tracking cameras 106. As the object crosses the field of view of each tracking camera 106, that tracking camera 106 is turned on to capture high-resolution, zoomed-in images of the object. When the object exits the field of view of one of the tracking cameras 106, and enters the field of view of a second one of the tracking cameras 106, the first camera 106 is turned off, and the second camera 106 is turned on to continue to capture high-resolution, zoomed-in images of the object. Thus, the object is tracked by multiple high-resolution cameras 106 as it moves across the room, without the need to provide motors to change the position of the cameras 106.

It will be understood by a person of ordinary skill in the art that functions performed by camera system 100 may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

One form of the present invention provides a motion detecting security camera system that consumes a relatively small amount of power, and that captures high-resolution images. The security camera system of one form of the invention uses relatively low-cost and low power consumption CMOS image sensors. The camera system of one embodiment of the present invention is battery powered. One form of the present invention provides a camera system with more power savings than prior art camera systems. The power savings provided by embodiments of the present invention provide for longer battery life, and/or the ability to use smaller batteries.

One form of the present invention uses a low power, low cost, motion detector that is less expensive and consumes less power than existing motion detectors. In one embodiment, the motion detector is based on an Agilent ADNS 2020 image sensor chip operated primarily in a low power sleep mode, and consumes about 500 microamps at 3.3 volts (1.5 milliwatts), thereby providing about 386 hours of usage using a 9-volt cell, or about 11,400 hours of usage using two battery "D" cells. In one form of the invention, the low power motion detector can be optimized for a particular application to further reduce the power consumption, and provide up to about five years or more of usage from two battery "D" cells. For example, the number of gates in the image sensor chip can be reduced, and the sleep time can be increased, to further reduce power consumption.

The image sensor (e.g., ADNS 2020) used in the motion detector according to one aspect of the invention uses only a limited amount of supporting hardware (e.g., inexpensive optical lens, batteries, circuit board, and housing), thereby providing a low cost motion detecting solution. In addition, the motion detector used in one embodiment of the present invention provides better detection of smaller scene details than a typical PIR motion detector.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A camera system, comprising:
   a low-resolution camera;
   a plurality of high-resolution cameras, the low-resolution camera and plurality of high-resolution cameras sharing a common image sensor, a plurality of image sensing regions of the common image sensor being associated with the low-resolution camera, the low resolution camera having a lower resolution than each of the high resolution cameras such that each high-resolution camera includes a respectively different image sensing region of the plurality of image sensing regions of the common image sensor; and
   wherein the low-resolution camera is configured to: (1) detect motion of an object across fields of view of a series of image sensing regions based on sensed images, (2) identify a composite region encompassing a plurality of image sensing regions associated with the detected motion of the object (3) power on individual ones of the high-resolution cameras corresponding to the composite region, and (4) power off each of the individual ones of the powered on high-resolution cameras after the object is not within the field of view of a respective image sensing region.

2. The camera system of claim 1, and further comprising:
   storage media coupled to the high-resolution cameras for storing high-resolution images captured by the high-resolution cameras.

3. The camera system of claim 1, wherein the plurality of image sensing regions associated with the low-resolution camera have less than about 1000 pixels.

4. The camera system of claim 1, wherein the plurality of image sensing regions associated with the low-resolution camera have less than about 300 pixels.

5. The camera system of claim 1, wherein each of the high-resolution cameras includes at least about 300,000 respectively different pixels of the common image sensor.

6. The camera system of claim 1, wherein the common image sensor is a CMOS image sensor.

7. The camera system of claim 1, wherein the low-resolution camera has a field of view that is substantially the same as a combined field of view of the plurality of high-resolution cameras.

8. A method of automatically capturing high-resolution images of a moving object, the method comprising:
   sharing a common image sensor among a low-resolution camera and a plurality of high-resolution cameras, the low resolution camera having a lower resolution than each of the high resolution cameras;
   associating a plurality of image sensing regions of the common image sensor with the low-resolution camera such that each high-resolution camera includes a respectively different image sensing region of the plurality of image sensing regions of the common image sensor;
   capturing, using the low-resolution camera, a plurality of low-resolution images of a scene;
   detecting motion of an object across fields of view of a series of image sensing regions based on a comparison of the low-resolution images using the plurality of image sensing regions;
   identifying a composite region encompassing a plurality of image sensing regions associated with the detected motion of the object;
   selectively powering on individual ones of the high-resolution cameras associated with the composite region
   selectively powering off each of the individual ones of the powered on high-resolution cameras after the object is not within the field of view of a respective image sensing region; and
   capturing high-resolution images of the object with the powered on high-resolution cameras.

9. The method of claim 8, wherein the low-resolution camera has a first field of view, and each of the high-resolution cameras has a respective field of view that is a subset of the first field of view.

10. The method of claim 8, and further comprising:
    storing the captured high-resolution images on a storage medium.

11. A low-power security camera system, comprising:
    a low-resolution camera configured to capture low-resolution images of a scene, and detect motion of an object moving within the scene based on the captured images;
    a plurality of high-resolution cameras, each high-resolution camera configured to capture high-resolution images of a subset of the scene; and
    wherein the low-resolution camera and plurality of high-resolution cameras share a common image sensor, a plurality of image sensing regions of the common image sensor being associated with the low-resolution camera, the low resolution camera having a lower resolution than each of the high resolution cameras such that each high-resolution camera includes a respectively different image sensing region of the plurality of image sensing regions of the common image sensor, the low-resolution camera, using the plurality of associated image sensing regions to detect the motion of the object across fields of view of a series of image sensing regions based on sensed images, is configured to identify a composite region encompassing a plurality of image sensing regions associated with the detected motion of the object, to selectively power on individual ones of the high-resolution cameras corresponding to the composite region and to selectively power off each of the individual ones of the powered on high-resolution cameras after the object is not within the field of view of a respective image sensing region.

12. The camera system of claim 11, further comprising:
    storage media coupled to the high-resolution cameras for storing high-resolution images captured by the high-resolution cameras.

13. The camera system of claims 11, wherein the low-resolution camera uses a portion of a CMOS image sensor with between about 250 and 1000 pixels.

14. The camera system of claim 11, wherein each of the high-resolution cameras uses a portion of an image sensor with at least about 300,00 pixels.

15. The camera system of claim 14, wherein the image sensor of each of the high-resolution cameras is a CMOS image sensor.

16. The camera system of claim 11, wherein the low-resolution camera has a field of view that is substantially the same as a combined field of view of the plurality of high-resolution cameras.

* * * * *